United States Patent [19]

Tabler

[11] 4,051,209
[45] Sept. 27, 1977

[54] CONTINUOUS RIGID FOAM PANEL PRODUCTION

[75] Inventor: Charles P. Tabler, Hamilton, Ohio

[73] Assignee: Kornylak Corporation, Hamilton, Ohio

[21] Appl. No.: 570,451

[22] Filed: Apr. 22, 1975

[51] Int. Cl.² ............................................. B29D 27/04
[52] U.S. Cl. .......................................... 264/39; 52/98;
  52/220; 52/309.14; 264/40.7; 264/46.5; 264/51;
  264/154; 264/251; 264/261; 425/375; 425/817
  C; 428/310; 428/313
[58] Field of Search ................ 264/46.5, 40, 54, 46.2,
  264/39, 40.7, 39, 51, 154, 251, 261; 425/375,
  817 C; 428/310, 313

[56] References Cited

U.S. PATENT DOCUMENTS

| 2,862,239 | 12/1958 | Pollard et al. | 264/39 |
| 3,090,078 | 5/1963 | Ackles | 264/46.5 X |
| 3,122,785 | 3/1964 | Weinbrenner et al. | 264/40 X |
| 3,311,948 | 4/1967 | Axelsonn | 264/54 X |
| 3,329,750 | 7/1967 | Growald | 264/46.5 X |
| 3,345,999 | 10/1967 | Boggs | 264/39 X |
| 3,369,065 | 2/1968 | Keith | 264/46.2 |
| 3,551,947 | 1/1971 | Jennings | 264/40 X |
| 3,677,681 | 7/1972 | Zippel et al. | 264/40 X |
| 3,776,990 | 12/1974 | Watkins et al. | 264/46.5 X |
| 3,814,780 | 6/1974 | Woodhall | 264/40 X |
| 3,824,057 | 7/1974 | Kornylak et al. | 264/46.2 X |
| 3,832,427 | 8/1974 | Mutch | 264/39 |
| 3,833,695 | 9/1974 | Vidal | 264/46.7 X |
| 3,846,524 | 11/1974 | Elmore et al. | 264/46.3 X |
| 3,859,401 | 1/1975 | Gallap et al. | 264/46.5 X |
| 3,891,368 | 6/1975 | Hart | 264/40 |

FOREIGN PATENT DOCUMENTS

| 1,198,393 | 7/1970 | United Kingdom | 264/46.5 |

*Primary Examiner*—Philip Anderson
*Attorney, Agent, or Firm*—Beall & Jeffery

[57] ABSTRACT

Composite panelling of upper and lower metal skins with side configurations for interlocking and a rigid foam core are continuously made by feeding separate upper and lower skin panels secured together by preassembled rigid foam end dams continuously past a foam station having a small height mixing head mounted on cross slides to lay down a zigzag pattern of foam between the skins, with the first and last transverse run of foam being parallel to the ends of the skins. A mixing head is such that valves are located within the head so that the two foamable chemicals do not contact each other until they are fed into the mixing chamber wherein a mechanical mixer mixes them immediately prior to being deposited, which mechanical mixer and valves are of minimum height and fully insertable within the molding space between the skins. A drive motor for the mixer is located in the main body supporting the mixing head, which main body does not enter into the mold cavity. The valves and cross slide are operated automatically, and if there is too long a delay between foam deposits, the chemical valve faces, mixing chamber, mechanical mixer and other parts exposed to the mixed chemicals will automatically be flushed with a solvent and air.

9 Claims, 19 Drawing Figures

| PANEL POSITION | HEAD 30 TRANSVERSE | HEAD 30 FEED | HEAD 30 RETURN | MOTOR 45 | VALVES 40 & 41 | VALVES 42 & 43 |
|---|---|---|---|---|---|---|
| 1 FRONT | X | X | | X | X | |
| 1 BODY | X | | | X | X | |
| 1 END | X | X | | X | X | |
| SPACE | | | X | | | |
| 2 FRONT | X | X | | X | X | |
| 2 BODY | X | | | X | X | |
| 2 END | X | X | | X | X | |
| SPACE | | | X | | | |
| DELAY | | | | X | | X |

FIG. 8

———— HEAD 1
—·—·— HEAD 2

CONTINUOUS RIGID FOAM PANEL PRODUCTION

BACKGROUND OF THE INVENTION

There is a need for composite panels, particularly in the building industry, wherein rigid outer skins, for example rolled steel sheet, are laminated with a rigid foam core. Various apparatus are known to continuously make such composite panels, but the use of rigid outer skins presents many production problems.

A foam probe that extends between the outer skins into the molding zone to lay down a pattern of foamable chemicals has a disadvantage that there is a large pressure drop in such a probe that would of necessity be as long as the width of the panels, which may be three or more feet in width. The foamable chemicals are mixed prior to their travel into and through the probe, so that they are mixed completely outside of the molding zone and must travel for three or more feet within the probe, during which time they are starting to react. It is desirable to have the reaction time as fast as possible so that the length of the pressure and curing tunnel may be as short as possible and the speed of the production line may be as fast as possible. However, it is also desirable to have the reaction time as slow as possible with respect to such a long probe, because if the foam were to react fast it would be exerting considerable back pressure in the probe as it expands in the probe and further it would tend to permanently deposit in and clog up the probe. Further if separate panels are being made on a continuous basis, withdraw of the probe from one panel would result in the mixed foamable chemicals remaining static within the long probe until the next panel comes into position, which combined with the length of the probe compounds the above problems.

It is known to connect the opposite edges of the panel skins with separate connectors to form a hinge, and to pivot the skins about their back edge for an angle of 45° or more in order to insert bulky foam depositing apparatus, but this in turn is not a satisfactory solution, because considerable room would thereafter be necessary to pivot the skins back into their final parallel position before they could enter into a pressure and curing tunnel, which again would require a very slow reacting speed for the foamable chemicals so that the skins could be reassembled in their final parallel relationship and enter the pressure and curing tunnel before substantial expansion; this would correspondingly either greatly slow down the process or greatly increase the length of the pressure and curing tunnel.

The construction of the pressure and curing tunnel must be very rigid to resist the substantial foaming pressures, which may be in the order of 5 pounds per square inch, and further to form rigid backing so that an accurate product may be formed. Thus, the expense per linear foot of the pressure and curing tunnel is considerably high so that it is advantageous to construct it as short as possible. At the same time, it is of course advantageous to construct the entire apparatus such that the linear speed of the product may be as high as possible to gain the most production from a single line.

SUMMARY OF THE INVENTION

It is an object of the present invention to provide a satisfactory system to meet the above needs without the difficulties of the prior art wherein the meeting of one need will correspondingly be disadvantageous with respect to another need.

Instead of a probe, which has heretofore been used solely as an extension of the nozzle, or an inactive conduit between the valving and mixing section and the dispensing section, the present invention employs an active mixing head that completely enters a small height molding zone, that may be only 1 inch high, and carries valves that will permit combining of the chemicals only as they enter the mixing chamber wherein they are immediately mixed by mechanically driven mixers and immediately dispensed to the mold, so that their time within the mixing and dispensing apparatus after their combining is kept at a minimum. The drive for the mixer and the controlled valves are carried by the bulky main body that does not enter the mold cavity, and the mixing valving is accomplished by pressure responsive valves within the mixing head immediately adjacent the mixing chamber.

In filling a rectangular plan view mold cavity, the mixing head is mounted on cross slides or the like so that as the rectangular mold cavity moves by the mixing head it may move parallel with the moving front end of the mold cavity, move in a zigzag path through the body of the mold cavity, and again move parallel to the rear end of the mold cavity, to accordingly completely fill the mold cavity.

If the opposed skins are not completely self-supporting, at least to a degree sufficient to provide adequate space for the entrance of the mixing head, the skins may be held apart by very small rigid foam blocks that are easily knocked over by the head to become a part of the final product.

The controls are such that separate panels are individually sensed so as to control the operation of the mixing head, with respect to the above-mentioned lay down pattern. Further, if there is an abnormal delay between panels, that is between times that the mixing head would dispense, valves for a solvent and air will automatically open so as to completely flush the chemical valve faces, conduits, mixing chamber, mechanical mixing means, and dispensing opening (that is all parts that come in contact with the mixed chemicals) so as to prevent any deposits building up within the mixing head.

Although the mixing head has a height substantially less than one inch and needs very little clearance, there are occasions wherein the normal spacing of the skins would produce a gap at the sides, particularly when configured side flanges are employed for the skins, that would be insufficient for entrance of the mixing head, and for this purpose guide means may be employed to slightly flex the side edges of the skins or one skin to permit entrance of the mixing head, while most of the flexed skin will remain in its parallel position so that the length of the foamed depositing area is not increased to any substantial extent in the production line.

BRIEF DESCRIPTION OF THE DRAWING

Further objects, features and advantages of the present invention will become more clear from the following detailed description of the accompanying drawing, which shows a preferred embodiment of the invention.

DETAILED DESCRIPTION OF A PREFERRED EMBODIMENT

Figures 1, 2, 3:
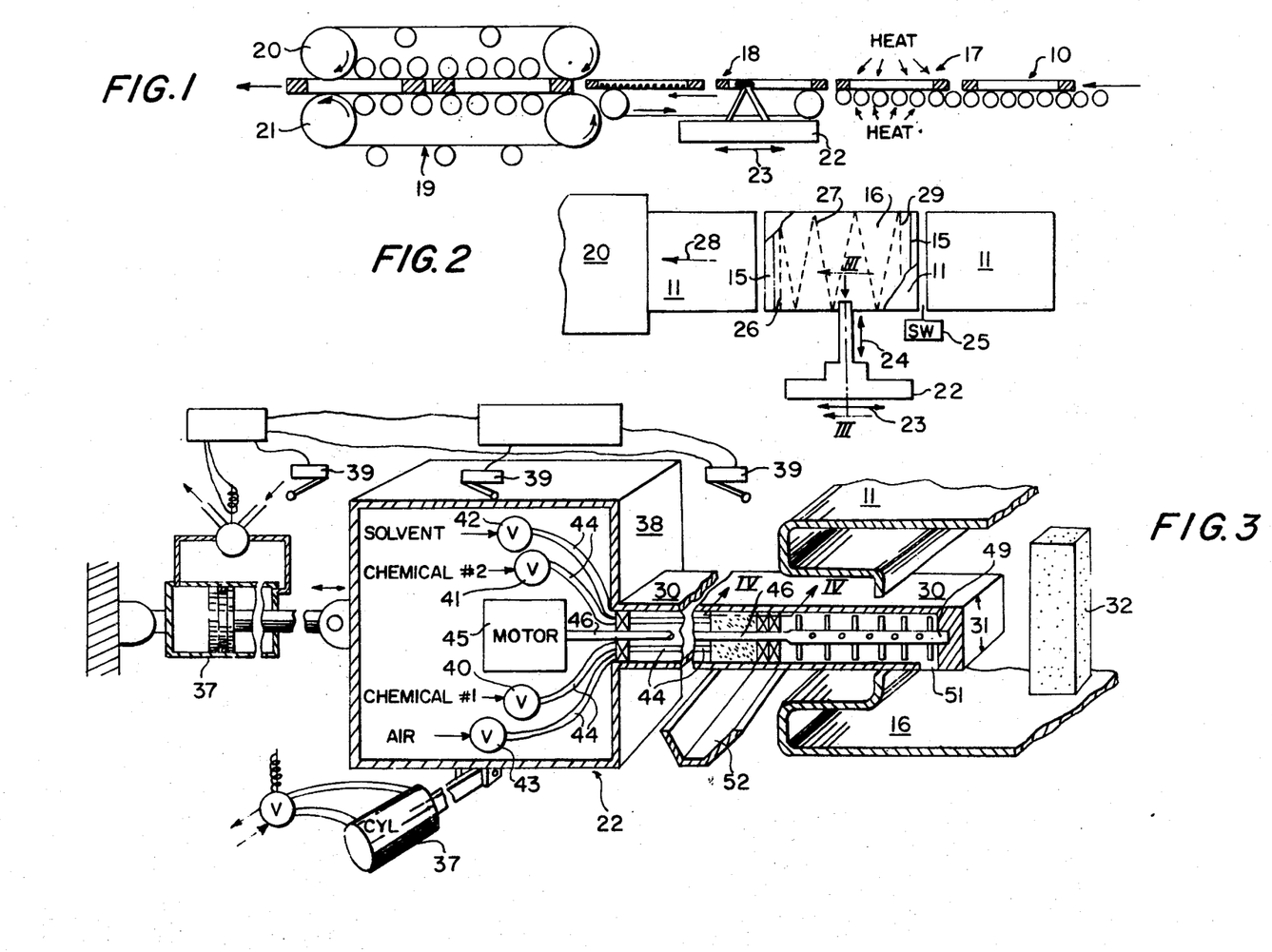
FIG. 1 is a schematic side elevation view of the composite panel production run employing the features of the present invention.
FIG. 2 is a schematic top view of a portion of FIG. 1.
FIG. 3 is a partial cross sectional view, in schematic form, taken along line III—III of FIG. 2.
Figures 5, 6:
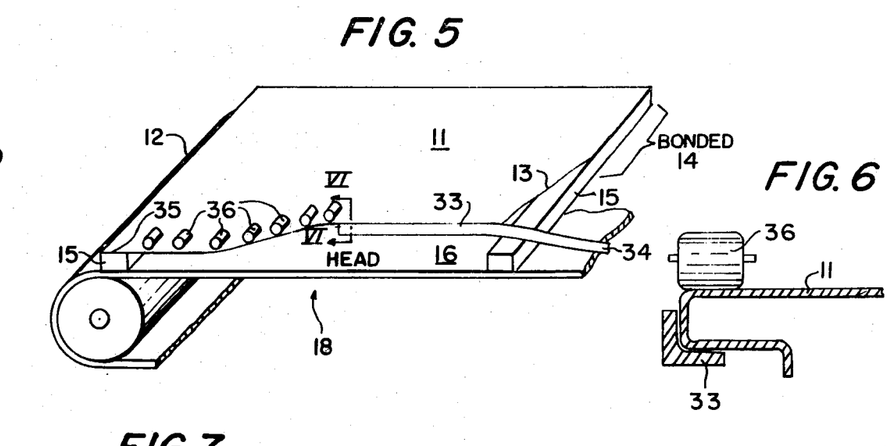
FIG. 5 is a schematic perspective view of a portion of the apparatus for flexing the top skin to facilitate entrance of the mixing head.
FIG. 6 is a partial cross sectional view taken along line VI—VI of FIG. 5.

For making the composite panels of outer rigid skins and inner rigid foam, the skins are initially assembled in generally parallel relationship at station 10 in FIG. 1, which initial relationship may best be explained with respect to FIG. 5, although FIG. 5 is not a view of station 10. The upper rigid skin 11 has a front edge 12 and a rear edge 13, each of which are bonded over half their width, as shown with respect to the rear edge 13, at 14 to a generally rectangular bar 15 of rigid foam material, which bar 15 is in turn at least partially bonded to the lower skin 16. This initial assembly may be conducted by hand or automatic machinery, not a part of the present invention. Further, it is contemplated that most of the features of the present invention may be employed with respect to a continuous supply of the upper skin and lower skin 16, and in such case only the bar 15 would be needed at the front edges of such supplies during start-up and thereafter not needed until the system was closed down, at which time a rear bar would be needed. In such a modification, the skins could be provided from the outlet of a rolling mill, or from coils of such material. If configured edges or ribbed portions in the center of the skins were needed, rolling mills could be provided immediately adjacent the apparatus shown in FIG. 1 for such forming. However for purposes of a preferred embodiment, the present invention will be described with respect to the formation of individual panels from separate upper and lower sheets, as shown and described with respect to FIG. 5.

As shown at station 17, FIG. 1, the thus assembled upper and lower skins are each heated in a conventional way, which per se forms no part of the present invention.

At station 18, the mixing head is inserted between the upper and lower skins 11, 16 to deposit foamable chemicals within the molding zone created by the upper and lower skins 11, 16, and end dams or bars 15. Thereafter, the assembly will enter pressure and curing tunnel 19, which per se forms no part of the present invention and may be of conventional construction having a rigid upper endless conveyor 20, a rigid lower endless conveyor 21, and side dams carried by one or more of such conveyors or the like to close off the sides of the tunnel, as shown in Kornylak U.S. Pat. No. 3,824,057, issued July 16, 1974 incorporated herein by reference.

The bottom skin 16 may be supported and conveyed through stations 10, 17 and 18 in any manner, and driven lower rolls are shown at stations 10 and 17 along with a driven endless belt conveyor at station 18 for purposes of illustration. The bonding of the upper and lower skins 11, 16 together by the bars 15 will form a drive for the upper skin 11, although such bonding may not be necessary and only friction relied upon. Further if the upper and lower skins 11, 16 were supplied from a continuous source such as a rolling mill as briefly mentioned above, after the line was in production with a composite panel being formed in the pressure tunnel 19, the substantial foaming pressure forcing the upper skin 11 against the driven conveyor 20 and bonding and removal of the final product would assure synchronous driving of both the upper and lower skins throughout the entire apparatus. In any event, the bars 15 are constructed of rigid foam material having substantially the same composition as the final cured core, so that they remain a part of the final product.

At station 18, the foam depositing apparatus 22, which is schematically shown in FIGS. 1 and 2, is mounted by any means, for example a conventional cross slide, for reciprocating movement in the direction of arrows 23 that is parallel to the conveying direction and further for reciprocating movement in the direction of arrows 24 that is transverse to the conveying direction. A switch 25 senses the beginning of a new panel assembly, and with suitable timing means the foam depositing apparatus 22 at the appropriate time is moved in the conveying direction at the same speed as the adjacent panel (that is in the direction of one of the arrows 23) and simultaneously moved from a withdrawn position toward and into the mold cavity formed by the upper and lower skins 11, 16 in a direction transverse to the conveying direction (that is in the direction of one of the arrows 24), so that the foam will be deposited along a line 26 running closely adjacent and parallel to the forward bar 15 after making one or more passes; movement of the foam depositing apparatus 22 in the direction of arrows 23 is thereafter stopped or slowed while it is reciprocated at the same or a different speed in the direction of arrows 24 so as to form the zigzag foam depositing pattern 27 because of the relative speed between the head and mold. The zigzag foam depositing pattern 27 has been exaggerated for purposes of illustration, and in actual practice the number of reciprocations indicated by arrows 24 would be many times that illustrated by the dotted lines 27 for each panel. When the switch 25 indicates that the end of the panel has been reached, drive mechanism is again automatically actuated, with an appropriate delay, to again move the foaming apparatus in the conveying direction 28 at the same speed as the panel so that the last pass of the apparatus along line 29 in the direction of the other one of the arrows 24 will be parallel to and closely adjacent the rear one of the bars 15 to form an even distribution of foamable chemicals throughout the interior of the generally rectangular mold cavity. The controls will assure that the foaming apparatus remains removed from the mold cavity until the next assembly of skins 11, 16 and bars 15 arrives, at which time the process will be repeated.

As shown in FIG. 3, the upper and lower skins 11, 16 may have an edge configuration as shown adjacent the foam depositing apparatus 22, and a complementary edge configuration (not shown) along the opposite edges away from the foam depositing apparatus 22, so that the finished product may have interlocking edges with respect to two adjacent panels assembled at a building site coplanar with respect to each other. In any event, the shape of such edge portions will decrease the effective spacing between the skins 11, 16 for the entrance of the foam head 30 into the mold cavity as defined by the skins 11, 16. The foam head 30 according to the present invention is constructed so as to have a very small height 31, which in actual practice has been less than one inch, while at the same time providing a mixing chamber, a mechanical mixer, and mixing valves immediately adjacent the mixing chamber, all in the height 31 of the mixing head to be inserted within the molding zone.

To prevent sagging within the central portion of the skin 11, very small foam blocks 32 as shown in FIG. 3 may be inserted in the central regions, at appropriate spacings, to maintain a spacing between the skins 11, 16 sufficient for reciprocation of the foam head without obstruction. Such foam blocks 32 would be assembled at station 10, would be knocked over easily by the reciprocating foaming head 30, and would remain within the mold cavity as a part of the final product, so that for this purpose, the blocks 32 would have substantially the same composition as the remaining portions of the final product core. It is further contemplated that other means (not shown) such as upper and lower rollers, air pressure or the like may be employed temporarily within the mold cavity to maintain the spacing of skin 11 above skin 16 and removed before or immediately after the depositing of the foam material. If longitudinally extending ribs are provided in the upper skin 11, it may be sufficiently self-supporting such that the above-described means including the blocks 32 would not be necessary.

With the mixing head having a total height of less than one inch, there will be very few occasions when the distance between the edge flanges of the skins 11, 16 is insufficient for the insertion of the mixing head, and on such occasions, the skins may be flexed slightly, but no more than one inch, along their edges adjacent to the mixing head as shown in FIGS. 5 and 6. As mentioned previously, the end portions of the skin 11 adjacent the head may be left unbonded with respect to the bars 15, so that they may be lifted by engagement with a cam rail 33. The entrance end 34 of the cam rail 33 is arranged to pick up the leading edge 35 of sheet 11, lift it one inch or less, and support it in such lifted position along the area where the mixing head is inserted into the mold cavity between the skins 11, 16. The skin, though basically rigid, will be sufficiently resilient to flex so that only a small portion of it will be elastically bent beyond the position horizontal and parallel to the skin 16, and thereafter returned to such parallel position without permanent deformation or scarring. After leaving the rail 33, the side edge portion adjacent the head is guided back into its horizontal position parallel with skin 16 by means of a single or a plurality of horizontal axis rollers 36.

The foam depositing apparatus, employs cross slide (not shown) and translating mechanism (cylinders 37), main control valve and main body 38, and automatic valve and mixing head 30. The specific details of the preferred structure for the main body and mixing head are more fully shown and described in copending application Ser. No. 570,455 filed on even date herewith, commonly assigned, the disclosure of which is incorporated herein in its entirety by reference.

The double acting cylinder 37 shown connected to the bottom of the main body 38 is operative to reciprocate the mixing head 30, main body 38 and other cylinder 37 in the direction of arrows 23 in FIGS. 1 and 2; the double acting cylinder shown attached to the left hand portion of the main body 38 in FIG. 3 is operative to reciprocate the main body 38 and mixing head 30 in the direction of arrows 24 in FIG. 2. The drive mechanism for such reciprocation may take on any form and per se forms no part of the present invention, and double acting fluid cylinders with supply and exhaust solenoid operated valves have been shown only as examples of any conventional type of drive that may be used. Further, since cross slides or the like are known, such have not been shown in detail. Suitable controls, in addition to switch 25 of FIG. 2, are provided to control such reciprocation, and such controls may be of any well known type, which controls and circuitry will be readily understood to those having ordinary skill in the art of controls and circuitry after having understood the basic control functions and methods described herein. By way of partial example, limit switches 39 may be selectively placed to control the fully retracted and fully inserted positions of the mixing head 30, control the beginning and end of dispensing, and the like.

From a suitable, preferably stationary, supply (not shown) foamable chemicals are supplied in a known manner to the main body 38. A first chemical is supplied to a solenoid operated valve 40, a second foamable chemical is supplied to a solenoid operated valve 41, a chemical solvent is supplied to the solenoid operated valve 42, and compressed air is supplied to the solenoid operated valve 43, all of which valves have a fully opened and a fully closed position under selective control by electrical circuitry (not shown) according to a control method to be described. Lines 44 provide fluid communication between the main body 38 and the mixing head 30. Further, the main body 38 carries an electric or hydraulic motor 45, which has a drive shaft 46 extending from the main body 38 into the mixing head 30. As mentioned previously, only the mixing head 30 is inserted, and in fact almost entirely inserted, into the mold cavity between the skins 11, 16; and the main body 38, although rigid with and moving with the mixing head 30, remains entirely outside of the mold cavity. Thus, the bulky items such as controllable valves 40, 41, 42, 43, inlet couplings for the chemicals and air (not shown), and drive motor 45 may be suitably housed without critical size limitations as dictated by the mold cavity. In FIG. 3, the mixing head 30 is shown broken with a portion removed, and it is to be understood that this portion removed may be 3, 4, 5 or more feet in length, depending upon the width of the mold cavity. Such removed portion would only contain a drive shaft 46 and fluid lines 44, as well as suitable bearings and the like, but it would have basically the same outer dimensions, with height 31, as a remaining portion of the mixing head 30 illustrated.

Figure 4:
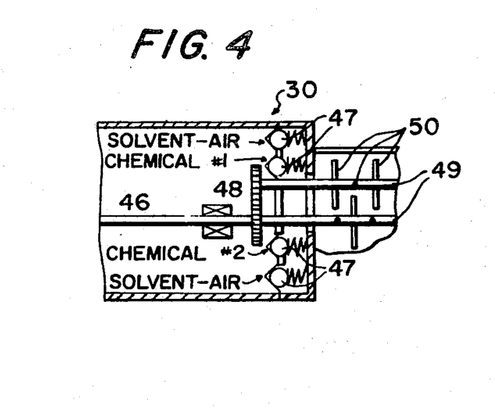
FIG. 4 is a schematic view along line IV—IV of FIG. 3.

As shown more fully in FIG. 4, the outermost portion of the mixing head 30 includes normally closed, fixed pressure opening, automatic valves 47. At their inlet, these valves are respectively connected, as indicated, to the appropriate ones of the lines 44 so that as is seen in FIG. 4 the topmost valve 47 will receive a mixture of solvent and air, the next valve 47 will receive the first foamable chemical, the next valve 47 will receive the second foamable chemical, and the bottommost valve 47 will receive the mixture of solvent and air; it is to be understood that FIG. 4 is shown in plan cross sectional view, so that in the actual apparatus, the valves 47 and drive shaft 46 lie substantially in a common horizontal plane. The shaft 46, through a spur gear pair 48 drives counter rotating shafts 49, each of which has a plurality of cross pins 50. The interior of the mixing head 30 containing therein the counter rotating mixing shafts 49 forms a mixing chamber having one end defined by the outlet side of the valves 47 and its opposite end defined by the discharge opening 51.

Beneath the mixing head 30 and immediately adjacent the opening edge of the mold cavity, there is provided a stationary trough 52 to receive unused chemicals and solvent during cleaning, as will be described below.

Figure 7:
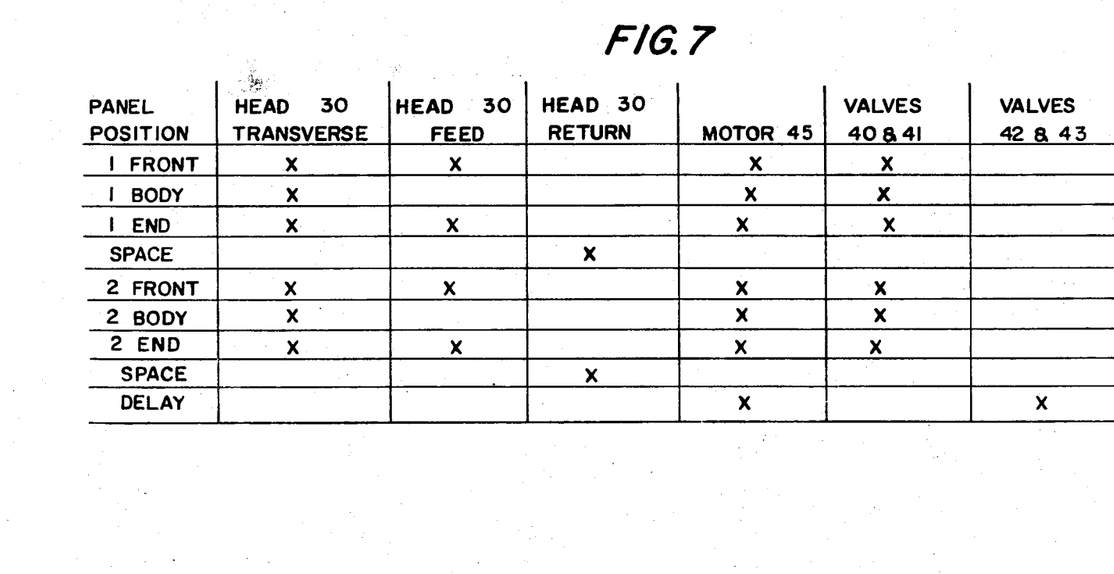
FIG. 7 is a control chart illustrating the sequence of controls for automatically operating the apparatus.

The sequence of operation of the valves for mixing chemicals and cleaning the mixing chamber, in coordination with the individual mold cavities and cross slide reciprocation of the mixing head will be discussed with respect to the control chart of FIG. 7.

When the appropriate sensors and controls indicate that the forwardmost bar 15 of an assembly of bars 15 and skins 11, 16, has just cleared the mixing head 30 in its retracted position, such will be the panel position "1 front"; the drive means 37 will be actuated to move the head 30 from its retracted position to a position fully inserted within the mold cavity "transverse" and further to move the head 30 in the conveying direction at the conveying speed "feed", so that the discharge opening 51 of the head will move along the line 26 of FIG. 2, with respect to the bottom skin; during which time the valves 40 and 41 will be opened to admit the first and second foamable chemicals into the mixing chamber through valves 47 (valves 47 will automatically open after a predetermined substantial pressure is reached, which pressure is lower than the pressure of the chemicals as supplied by the valves 40 and 41); and in the mixing chamber, the chemicals are mixed by counter rotating shafts 49 driven by "motor" 45 prior to the thus mixed chemicals exiting through the discharge opening 51. Thus, the chemicals will be laid down in a single line 26 closely adjacent and parallel to the front bar 15.

Thereafter with "panel position" of "1 body", the controls will discontinue the head feed, that is, there will be no movement of the head in the conveying direction; it is also contemplated as a modification, the speed of the head in the conveying direction could be merely reduced, so that it would be less than the conveying speed. During this period, the head will continue to reciprocate back and forth transversely with the motor 45 operating and the valves 40, 41 opened so that the mixed foamable chemicals will be laid down in a zigzag pattern 27 within the mold cavity.

When the controls sense the end of the mold cavity, that is the presence of the rear bar 15 closely adjacent the mixing head, the final pass along line 29 of the discharge opening 51 will be conducted with the head being fed in the conveying direction at the same speed as the mold cavity while the motor 45 rotates and the valves 40, 41 are opened so that the foam is deposited along line 29 closely adjacent and parallel to the rearmost bar 15, which sequence of operations is shown in the chart as "end".

Immediately thereafter, the head 30 is completely withdrawn from the mold cavity, moved in the direction opposite to the conveying direction to its original position, and held in such position until the front of the next panel is sensed, at which time all of the above operations will be repeated. If at any time there is an unusual "delay" between mold cavities, which would result in a substantial danger of the mixed chemicals within the mixing chamber hardening or depositing to any degree on the chamber walls, a timing mechanism (for example, to automatically actuate 15 seconds after the last dispensing, that is after valves 40 and 41 were closed), would automatically open valves 42 and 43 and actuate motor 45 to pass solvent and air through pressure operated valves 47 and into the mixing chamber to clean the faces of valves 47 that control the chemicals, clean the counter rotating shafts 49 and pins 50, clean the walls of the mixing chamber, and clean the discharge opening 51. This cleaning would be accomplished with the head in its stationary position wherein the discharge opening 51 would be immediately above the collection trough 52, so that the waste chemicals and solvent could be collected and disposed of.

As a modification of the above described apparatus, the valves 47 may be in their exact same position for controlling the chemicals, solvent and air in the same manner, but being themselves actuated by means other than the pressure of the fluid being controlled. For example, these valves 47 may be spool valves spring urged in one direction and driven in their opposite direction by a pressurized fluid, for example air, which pressurized fluid for operating the valves 47 is controlled by means of selectively opened and closed valves that are electrically actuated between their two positions and which would be in the main body and in FIG. 3 would be represented by valves 40, 41, 42, 43, for respectively controlling the actuating fluid supplied to the air operated pilot valves located in the mixing head inserted within the mold (that is modified valves 47) to correspondingly respectively control the flow of chemical 1, the chemical 2, the solvent, and the air. Otherwise, the operation and remaining structure of this modified apparatus would be identical to that previously described.

Figure 18:
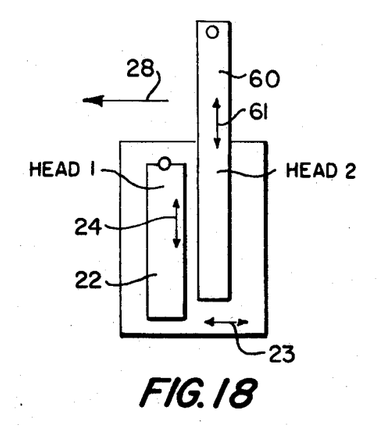
FIG. 18 is a schematic view of two heads on the carriage of FIGS. 1 and 2.

As a further refinement of the above apparatus and method, a second head may be provided for insertion into the mold cavity to produce different lay down patterns for the foam. The second head may be identical to the first head, or of a different length as shown in FIG. 18. As previously described, the foam depositing apparatus 22 can reciprocate in the direction of arrow 24 towards and away from the mold cavity perpendicular to the conveying direction 28 with respect to a carriage on which it is mounted, which carriage can reciprocate in the direction 23 parallel to the direction of the conveying motion 28. In addition to this previously described structure, a second head 60 is mounted on the same carriage to reciprocate with respect to the carriage in the direction of arrows 61 towards and away from the molding zone and perpendicular to the conveying direction 28. With head 60 being mounted upon the same carriage as foam depositing apparatus 22, it also will be reciprocated in the direction of arrows 23 along with foam depositing apparatus 22. The head 60 is preferably of a construction as shown in FIG. 3 with the main body 38 and head portion 30.

Figure 8:
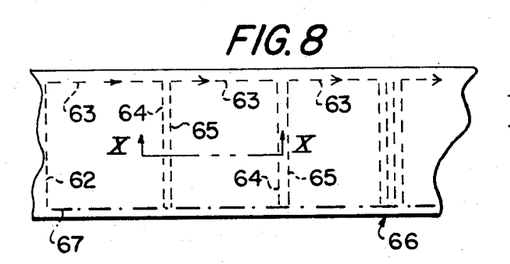
FIGS. 8, 11, 13, 15 and 17 are schematic plan views of foam depositing patterns.
Figure 9:
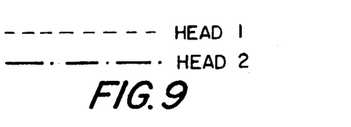
FIG. 9 shows a legend.

The double head arrangement of FIG. 18 may be used to produce a foam lay down pattern as shown in FIG. 8 where insulation of the finished product is not so important and it is desired to construct the voids within the panel to produce a hollow core panel. As shown in FIG. 9, the foam lay down path of the first head is shown with a dashed line, whereas the foam lay down path of the second head is shown with a dash dotted line. In a continuous production run with the upper and lower skins being provided directly from a rolling mill in continuous form, a repeat pattern may be produced as follows. Beginning of a panel, the first head will move in the conveying direction at the same speed as the conveyor and move perpendicular to the conveyor for the full width of the panel along line 62. Thereafter, the speed of the first head in the conveying direction is either stopped or slowed and the speed perpendicular to the conveying direction is stopped so that the lay down path will be along line 63. Next, the head is moved in the conveying direction at the speed of the conveyor and reciprocated perpendicular to the conveying direction first along line 64 in one direction and then along line 65 in the opposite direction. This pattern is repeated as many times as desired until the head reaches a portion of the upper and lower skins that will be cut to form a division between panels after curing, and at this point several passes 64, 65 will be made so that when the composite product is cut perpendicular to the conveying direction along the general line of symmetry of this lay down portion, there will be sufficient rigid foam on each side of the cut. The line of cut (with it being understood that the foam will expand, and be cured after its lay down before this cut when it leaves backup conveyors 20, 21) is shown at 66. During the above lay down path of the first foam dispensing head, the second foam dispensing head will remain stationary in a position where its dispensing nozzle will travel along line 67; the second dispensing head will dispense foam substantially at the same time as the first dispensing head is dispensing foam along line 63 and will not dispense any foam when the first dispensing head is moving along lines 64 and 65.

Figure 10:
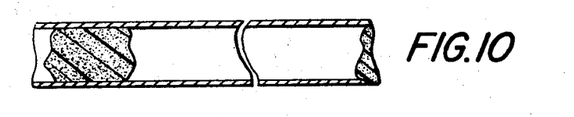
FIGS. 10, 12, 14 and 16 are partial cross sections on respective lines of FIGS. 8, 11, 13 and 15.

A cross section of the product produced according to FIG. 8 is shown in FIG. 10, in an enlarged scale with a portion removed.

Figure 11:
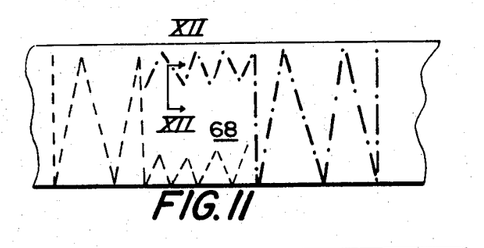
Figure 12:
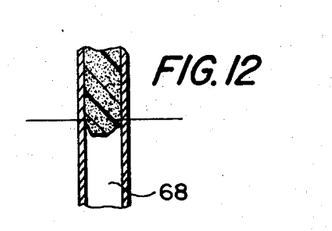

In FIG. 11, there is shown the foam lay down pattern for the first and second dispensing heads to produce a central cavity 68 that will not have any foam within it and be approximately rectangular. The pattern for the two heads, as shown in FIG. 11, will produce one final product wall panel, and it is understood that this pattern is repeated to produce similar panels. The partial cross section of FIG. 12 is on enlarged scale, and shows how the skins within the zone of the general rectangular cavity 68 may be cut to produce a rectangular opening into which a window or the like may be inserted when the final product panel is used at a construction site.

Figure 13:
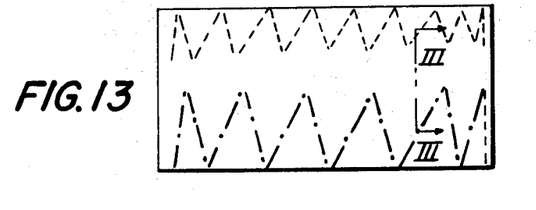
Figure 14:
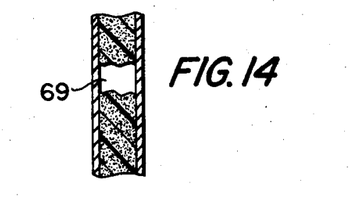

In FIG. 13, there is shown the repeat pattern of the two foam dispensing heads used in producing a cavity that will not have any foam within it, and which cavity will run for a full dimension of the panel parallel to the conveying direction, as shown in FIG. 14 wherein this cavity 69 may be used later at the construction site to hold water pipes, gas pipes, electrical wires, or the like.

Figure 15:
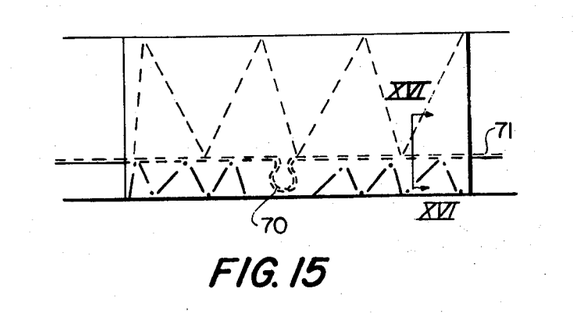
Figure 16:
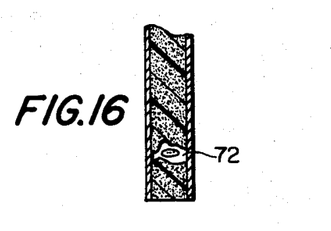

In FIG. 15, the lay down pattern for the two foam dispensing heads has been shown with respect to an electrical wire generally running parallel to the conveying direction. It is to be noted that the dispensing of foam from the second head is discontinued in the vicinity of a storage loop 70 for the wire 71, so that later when the panels are cut to size, there will be a storage loop 70 within each panel so that the cut portion of the wire (which will be cut when the final product is cut into panels) may be gripped and pulled to obtain extra wire from the storage loop for making electrical connections. Since the edges of the skins actually contain the configuration desired to interlock panels according to the preferred embodiment, the wire 71 will actually be in a vertical position when the wall is assembled, so that ceiling connections for the various wires may be made to an electrical source at the top of the panel; at the bottom of the panel, small cut outs may be made through the skin forming an interior wall for attaching electrical outlet boxes, or the like, for example. The lay down pattern of the first and second head may be such that they will produce a small cavity or void 72 between them as shown in FIG. 16 to facilitate shifting of the wire 71 at the construction site.

Figure 17:
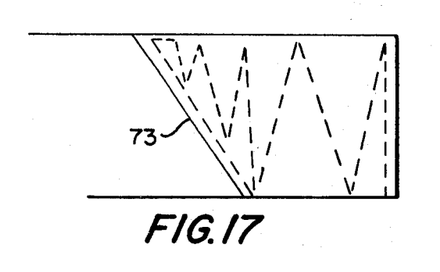

In FIG. 17, there is shown a lay down pattern that may be used in forming a wall panel that will form an end wall joining to a slopping roof. When the final continuous product has been cured, the cut to form the individual panels will be along line 73, which is at an acute angle with respect to the conveying direction and which will determine the roof slope. It is seen that adjacent panels will be mirror images of each other and may be used for opposite end walls. In such a situation, with no windows or other openings, one foam dispensing head may be used and follow the pattern as shown, which pattern is possible due to the cross slide action of the head mounting.

It is further contemplated that as a modification of FIG. 8, a third head may be used to produce a foam deposit line parallel to lines 63 and 67 and spaced between them, if desired. Further, door openings may be formed in a manner similar to the window openings.

Figure 19:
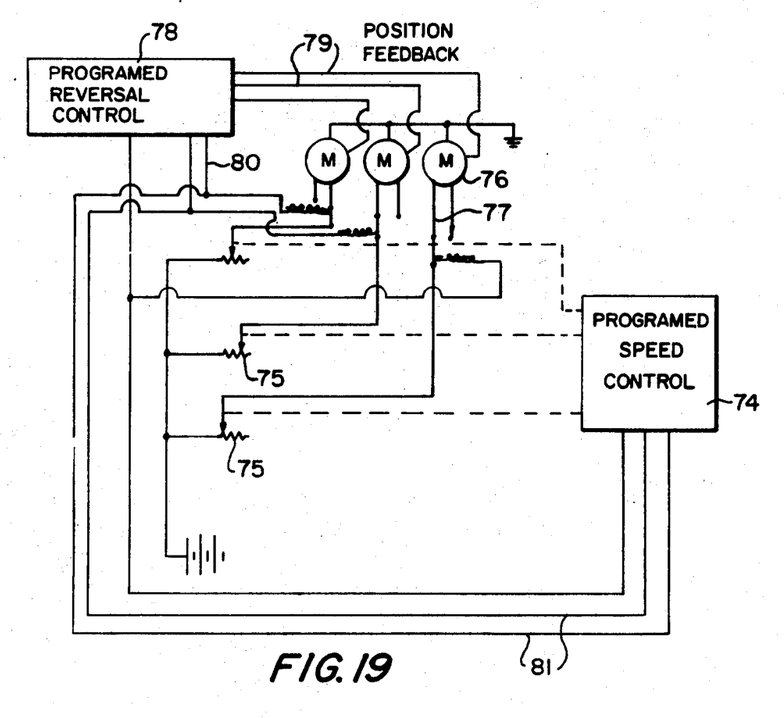
FIG. 19 is a control circuit.

While all of the above methods of panel production according to FIGS. 8-17, with the mentioned modifications, may be formed with the limit switches and hydraulic controls of FIGS. 2 and 3, a more versatile apparatus could employ the electrical controls of FIG. 19, so that the whole assembly line could be programed to produce on a continuous basis any desired panel, of a standard width, with automatic change from one type of panel to another type of panel as determined by the program. For example, the foam dispensing heads may be programed to produce one panel with a window opening, a subsequent panel with a door opening, two panels with slopping roof portions, three panels with no openings and a conduit raceway according to FIGS. 13 and 14, or combinations of the above such as a slope roof end wall according to FIG. 17 with a conduit according to FIG. 13 and with a window opening according to FIG. 11.

The above automatic programming could be accomplished by the schematic of FIG. 19, wherein three individual motors are shown, which are variable speed, D. C. reversible motors respectively to accomplish reciprocations 23, 24, 61. A programed speed control 74 may be controlled by a computer, magnetic tape, punched tape, punched card or the like so as to operate variable potentiometers 75 that respectively determine the amount of current and correspondingly the speed of the individual motors 76. Motor reversing switches 77 will control the direction of movement of the motors and correspondingly the direction of movement of the head; for example, in one position of switch 77, the motor for the head 60 may drive the head 60 toward the mold zone in the direction of one of the arrows 61, and in the other position of the switch 77, the motor may drive the head 60 away from the mold zone in the direction of the other of the arrows 61. The position of each reversing switch is determined by a relay coil under the control of a programed reversal control unit 78. The number of revolutions of each motor, or correspondingly the position of a head or carriage may be determined for each motor and fed back to the programed reversal control 78 by means of feed back lines 79. With such a feed back and the program contained within control 68, which program may similarily be of any known type like the program for control 74, the control will determine when the motors should be reversed and reversing signals will be sent out along lines 80 to the respective coils to operate the reversing switches. Also, these reversing signals may be sent out along lines 81 to the programed speed control unit 74 to correspondingly change the speed of the motors when they are reversed.

In this manner, head 60 may be reciprocated in the direction of arrows 61 independently of the reciprocation of foam depositing apparatus 22 in the direction of arrows 24, and at a different speed. Further, the length of the reciprocation of one head may be independent of the other head and changed at will. The exact details of the electronic circuitry for FIG. 19 have not been shown, because they do not form a part of the invention and any number of circuits could easily be constructed by a person having ordinary skill in the art with the present disclosure.

While FIGS. 8-19 have been described with respect to the continuous production of panels using continuously fed sheets to form the upper and lower skins in the molding zone, for example to be supplied from coils or a rolling mill, it is to be understood that all of the features of FIGS. 8-19 may also be used with respect to separate sheets assembled with end dams at a station 10 as shown in FIGS. 1 and 5.

Foam patterns involving raceways, door openings, window openings and the like may be accomplished by moving one head in a controlled pattern across the entire mold area with automatic pattern or program control of the chemical supply. The supply would be shut off when the head is over an area to be void of foam; that is valves 40 and 41 would be automatically closed when the head crosses a window opening area for example, and opened upon leaving the window opening area within the mold cavity.

While a preferred embodiment of the present invention has been described in detail, with variations and modifications mentioned, further embodiments, variations and modifications are contemplated according to the broader aspects of the present, all as determined by the spirit and scope of the following claims.

What is claimed is:

1. In a method of mixing two separately supplied chemicals to provide a foamable mixture and in response to a deposit signal, depositing the foamable mixture in a mold form to produce rigid synthetic foam, with contact between the two chemicals being only within a common mixture area before depositing, the improvement comprising: depositing the foamable mixture in response to a deposit signal in a mold form as the chemicals are supplied to, mixed in and flow through the common mixture area; thereafter discontinuing the depositing; thereafter automatically timing the period wherein mixed chemicals are maintained in the common mixture area without substantial depositing and flow of the chemicals through the mixture area; after said step of timing, depositing additional foamable mixture in response to a deposit signal only if the period of time after the last depositing step was discontinued is less than a fixed period of time that would result in substantial solidification of the chemicals, and preventing the depositing of additional foamable mixture despite the deposit signal only if the period of time after the last depositing step was discontinued is more than a fixed period of time that would result in substantial solidification of the chemicals; and automatically washing the mixture area with a solvent in response to the period of time after the last depositing step and before additional depositing exceeding a fixed period of time that would result in substantial solidification of the chemicals.

2. The method of claim 1, further including the steps of rotating a mechanical mixer within the mixture area during mixing and depositing of the foam chemicals, and further rotating the mechanical mixer within the mixture area during washing with the solvent.

3. The method of claim 1, further including the steps of supplying compressed air with the solvent through the mixture area to enhance the washing and discontinuing the supply of compressed air during the supplying of the chemicals to be mixed.

4. A method of forming rigid foam panels by depositing foamable chemicals in a generally horizontally extending closed top mold moving past a foam depositing apparatus in a molding direction with a transverse mold wall forming one end of the mold and thereafter allowing the foamable chemicals to foam and cure within the mold as it continuously moves through a foaming and curing zone, the improvement comprising the steps of: continuously moving the mold on an endless belt conveyor in the molding direction throughout the method; automatically sensing the position of the continuously moving transverse wall; automatically driving the foam depositing apparatus in the molding direction at the same speed as the continuously moving mold when the foam depositing apparatus is adjacent the interior edge of the transverse wall, and simultaneously moving the foam depositing apparatus transversely into the mold while depositing foamable chemicals along the interior edge of the transverse wall for substantially the full length of the transverse wall; thereafter reducing the speed of the foam depositing apparatus in the molding direction so as to provide a relative speed in the molding direction between the foam depositing apparatus and the continuously moving mold, and simultaneously moving the foam depositing apparatus transversely back and forth within the mold while depositing the foamable chemicals to form a zigzag pattern of chemicals deposited within the mold; withdrawing the foam depositing apparatus and thereafter curing the foam within the continuously moving mold in a pressure tunnel formed between the endless belt conveyor and an opposed endless belt conveyor.

5. The method of claim 4 including automatically terminating the depositing of foamable chemicals when the foam depositing apparatus is withdrawn from the mold to await the next mold for repeat of the above steps; automatically determining the time between the foam depositing apparatus withdrawn from one mold with no foam depositing and being inserted within the next mold with foam depositing, and only if the thus sensed time is greater than a fixed delay time, than automatically washing with a solvent the entire interior of the foam depositing apparatus that has come into contact with the mixed foamable chemicals.

6. A method of forming rigid foam panels by depositing foamable chemicals in a generally horizontally extending mold area having access only horizontally between top and bottom mold closure sheets that continuously moves past a foam depositing apparatus in a molding direction and thereafter allowing the foamable chemicals to foam and cure within the mold area as it continuously moves through a foaming and curing zone, the improvement comprising the steps of: automatically driving a first foam depositing apparatus inserted within one side of the mold in a zigzag pattern relative to the mold area while depositing foamable chemicals in the mold area along a first line as determined by the relative movement between the mold area and the foam depositing apparatus; simultaneously automatically driving a second foam depositing apparatus inserted within the side of the mold in a zigzag pattern relative to the mold area while depositing foamable chemicals in the mold area from the second foam depositing apparatus along a second line spaced from said first line, with the second line being determined by the relative movement between the mold area and the second foam depositing apparatus; said first foam depositing apparatus determining a foam depositing pattern within the mold area on the one side of the mold separate from and spaced from the foam depositing pattern on the other side of the mold determined by said second foam depositing apparatus; and automatically controlling the depositing of foamable chemicals by said one foam depositing apparatus and said second foam depositing apparatus in response to signals generated according to program to produce a large area free of cured and expanded foam in the final product between the patterns of foamable chemicals deposited by the one and second foam depositing apparatus.

7. The method of claim 6 further including the step of continuously providing an upper and vertically spaced lower sheet material defining therebetween the mold area; and after depositing of the foamable chemicals, foaming and final curing of the foamable chemicals, removing adjacent areas of said upper and said lower sheet material on opposite sides of the area substantially free of foamable chemicals in a pattern of to provide one of a window and door opening in the final product.

8. A method of forming rigid foam panels by depositing foamable chemicals in a generally horizontally extending mold area that continuously moves past a foam depositing apparatus in a molding direction and thereafter allowing the foamable chemicals to foam and cure within the mold area as it continuously moves through a foaming and curing zone, the improvement comprising the steps of: driving the foam depositing apparatus in a pattern across the area of the mold; controlling the foam depositing automatically in coordination with the driving of the foam apparatus to obtain a pattern of an area of cured foam and an area free of cured foam in the final product according to a desired pattern of one of a door and window opening to be in the final product, with the area free of cured foam being substantial in its extent; continuously providing an upper and vertically spaced lower sheet material defining therebetween the mold area; and after depositing of the foamable chemicals, foaming and final curing of the foamable chemicals, removing adjacent areas of said upper and lower sheet material on opposite sides of the area substantially free of foamable chemicals to provide one of a window and door opening in the final product.

9. The method of claim 8, wherein the controlling of the foam depositing and driving of the foam depositing apparatus obtains a channel substantially free of foamed and cured chemicals in the final panel that will extend through the mold area for the full length of at least one of the transverse extent and longitudinal extent of the final panel for receiving therein a conduit at the building site wherein the final panel is used as a wall member.

* * * * *